United States Patent
Fan

(10) Patent No.: US 6,953,823 B2
(45) Date of Patent: Oct. 11, 2005

(54) ELASTOMERIC INSULATING COMPOSITION FOR A SOLID PROPELLANT ROCKET MOTOR

(75) Inventor: Jun-Ling Fan, Taoyuan (TW)

(73) Assignee: Chung Shan Institute of Science and Technology, Taoyuan (TW)

( * ) Notice: Subject to any disclaimer, the term of this patent is extended or adjusted under 35 U.S.C. 154(b) by 170 days.

(21) Appl. No.: 10/437,083

(22) Filed: May 14, 2003

(65) Prior Publication Data

US 2004/0229989 A1 Nov. 18, 2004

(51) Int. Cl.$^7$ ................................................ C08K 5/03
(52) U.S. Cl. ........................ 524/467; 524/434; 524/436; 524/437; 524/492; 524/493; 524/515; 524/574
(58) Field of Search ........................ 524/434, 436–437, 524/467, 492–493, 515, 574

(56) References Cited

U.S. PATENT DOCUMENTS

2002/0018847 A1 * 2/2002 Guillot ........................ 427/230

* cited by examiner

Primary Examiner—Peter Szekely
(74) Attorney, Agent, or Firm—Bacon & Thomas

(57) ABSTRACT

Non-asbestos elastomeric insulating materials for solid propellant rocket motors are disclosed. The insulating materials are composed of EPDM rubber, polyaramide fiber, liquid EPDM rubber, magnesium hydroxide or aluminum hydroxide, silicon dioxide, chlorinated flame retardant compound and zinc hydroxystannate. The char forming organic fiber is used to substitute asbestos in traditional insulating materials that are believed to cause serious environmental problems. These fillers in the formulation, which when combined, have a synergistic effect that reduces the ablation rate significantly. Also, use of zinc hydroxystannate to substitute $Sb_2O_3$, may further reduce density of the insulator and smoke density and smoke toxicity of exhausted gas from the rocket motor.

6 Claims, No Drawings

ELASTOMERIC INSULATING COMPOSITION FOR A SOLID PROPELLANT ROCKET MOTOR

BACKGROUND OF THE INVENTION

1. Field of the Invention

The present invention relates to an elastomeric insulating composition for solid propellant rocket motors.

2. Description of Prior Art

In general, a propellant of solid rocket motors is composed of various kinds of high-energy materials and oxidizers. When ignited the propellant releases huge amount of gases and heat energy that propels the rocket to move forward at very high speed. However energy accumulated therein and temperature in the motor case can rise to 2400° C.~3700° C. in a very short time. Such high temperature may destroy the rocket motor case if it is not properly protected. Therefore an insulator is used in solid propellant rocket motors to protect the motors from damage.

Insulators usually contain fillers such as asbestos, aluminum hydroxide ($Al(OH)_3$), antimony oxide ($Sb_2O_3$) and silicon dioxide ($SiO_2$), etc. to increase the ablative resistance of the insulators. These fillers are added to a rubber compounding recipe and the resultant rubber stock is thereafter calendered into thin sheet. The uncured rubber sheet is applied to the inside wall of the motor case by a suitable method, such as an inflatable mandrel technique, and cured therefore to form the insulator layer.

U.S. Pat. No. 3,347,047 (1967) described a rubbery insulator containing 3 phr to 200 phr (parts per hundred weight) asbestos in rubber, which fulfills inflatable mandrel technique requirements in practical application work. A corresponding commercial product designated V-44 with a specific gravity 1.28 gr/cm$^3$ made by the Aerojet Company in the United States is made from NBR (nitrile butadiene rubber) and asbestos fiber. This product has been applied to tactical missiles such as the Patriot™ of the United States and the Gabriel™ of Israel.

U.S. Pat. No. 4,501,841 (1985) and U.S. Pat. No. 4,878,431 (1989) use polyaramid fiber and inorganic fillers in an insulator compounding recipe. Notable increasing in ablation resistance was disclosed. However, the specific gravity of this ablative material ranging from 1.4 gr/cm$^3$ to 1.5 gr/cm$^3$ is considered to increase the total weight of rocket motor and, therefore, its firing range is minimized.

U.S. Pat. No. 5,821,284 (1998) disclosed the synergistic effect of ammonium sulfate and antimony oxide that were used in an insulator composed of EPDM (ethylene-propylene diene terpolymer) rubber and polyaramid fiber. The ablation rate of the insulator thus prepared is significantly reduced because of such synergistic effect. The specific gravity of the insulator may be as low as 1.18 gr/cm$^3$. According to the patent, versatile application methods and better mechanical properties of the insulator are declared.

U.S. Pat. No. 5,498,649 (1996) disclosed an insulator made from EPDM (ethylene-propylene diene terpolymer) rubber containing polyamide and maleic anhydride with a low specific gravity. However, there is no data to support the ablative resistance character of this insulator in this patent. The disclosed insulator of this patent is compounded in a thermal plastic polymer that is totally different from the thermosetting rubbers of the general insulator formulation used.

Antimony oxide has long been used together with chlorinated flame retardant to form a synergistic effect in insulator formulations and is reported to have superior ablation resistant effect. However, antimony oxide releases toxic gas when burnt and that gas is harmful to the environment. Therefore, it is desirable to provide an improved composition of the insulating materials to mitigate and/or obviate the aforementioned shortcomings.

SUMMARY OF THE INVENTION

The present invention is to provide an elastomeric insulating composition for solid propellant rocket motors. This composition may effectively reduce the specific gravity of the insulator thereof and diminish smoke toxicity and smoke density of gas generated when the insulator is burnt.

The composition of the present invention primarily includes EPDM (ethylene-propylene diene terpolymer) rubber, Kevlar™ fiber, and a combination of ablation resistant fillers including aluminum hydroxide ($Al(OH)_3$), magnesium hydroxide ($Mg(OH)_2$), zinc hydroxystannate ($ZnSn(OH)_6$), silicon dioxide ($SiO_2$) and chlorinated flame retardants. Liquid EPDM rubber is used as a resin binder and processing plasticizer.

In the present invention, the asbestos fiber used in traditional insulators is repalced with organic polyaramid fiber. The polyaramid fiber is carbonized into hard char when ablated in a rocket motor and therefore enhances ablation resistance of the insulator.

The liquid EPDM rubber aforementioned is used to adjust elastic properties of the rubbery insulator, so that the insulator manufactured is pliable enough to be applied on the wall of rocket motor case by the inflatable mandrel technique. Accordingly, dedicated and expensive machines are unnecessary, which are usually required in preparation insulators of increased hardness due to high load of Kevlar™ fiber (over 30 phr) in compounding recipes.

Zinc hydroxystannate of the present invention is used as ablation resistance filler to replace traditional antimony oxide ($Sb_2O_3$) in order to reduce smoke density and smoke toxicity of the exhaust gas that is generated when the insulator is ablated. Furthermore, a synergistic effect is formed when zinc hydroxystannate is combined with aluminum hydroxide, magnesium hydroxide and halogenated flame retardant that reduce the ablation rate significantly. On the other hand, the specific gravity of the insulator thus made is also decreased since the density of zinc hydroxystannate is lower than antimony oxide (3.3 gr/cm$^3$ versus 5.6 gr/cm$^3$). Therefore, the rocket motor case is well protected from high temperature by a char layer formed from ablation of the insulator of this invention. Additionally, the firing range of the rocket is increased.

The cured insulator of this invention has low density, low thermal conductivity, suitable hardness and superior erosion resistance. Smoke density and toxicity of the exhausted gas from burning of the insulator is low. Carbonized hard char produced thereof protects the rocket motor case from high temperature generated by burning of propellant and therefore, flight security of the rocket is assured.

Other objects, advantages, and novel features of the invention will become more apparent from the following detailed description.

DETAILED DESCRIPTION OF THE INVENTION

The elastomeric insulating composition of the present invention comprises: (a) 50 phr to 95 phr (parts per hundred rates) of a solid ethylene-propylene diene terploymer rubber;

(b) 5 phr to 50 phr of a liquid ethylene-propylene diene terpolymer rubber; (c) 5 phr to 50 phr of a polyaramid fiber; (d) 1 phr to 3 phr of a sulfur; (e) 1 phr to 3 phr of a curing accelerator, the curing accelerator is selected from the group consisting of 4,4'-dithio dimorpholine and N-tert-butyl-2-benzo thiazole sulfenamide or a mixture thereof; and (f) 1 phr to 20 phr of a zinc hydroxystannate.

The above elastomeric insulating composition of the present invention can further comprise: (g) 10 phr to 50 phr of a chlorinated flame retardant, the chlorinated flame retardant is selected from the group consisting of 1,2,3,4,7,8,9, 10,13,13,14,14-dodecachloro-1,4,4a,5,6,6a,7,10,10a, 11,12, 12a-dodecahydro-1,4,7,10-dimethanodibenzo(a.e) cyclooctene or a mixture thereof; or (h) 20 phr to 120 phr of an inorganic filler, the inorganic filler is selected from the group consisting of silicon dioxide, aluminum hydroxide and magnesium hydroxide or a mixture thereof.

The above elastomeric insulating composition of the present invention can further comprise (i) 4 phr to 8 phr of a tackifier of synthetic polyterpene resin.

In the present invention, polyaramid fiber is used in the insulator formulation to replace asbestos fiber that is contained in traditional insulator compositions. Aluminum hydroxide ($Al(OH)_3$) or magnesium hydroxide ($Mg(OH)_2$), silicon dioxide ($SiO_2$), chlorinated flame retardant and zinc hydroxystannate ($ZnSn(OH)_6$) are provided in the insulator as ablation resistant fillers. EPDM (ethylene-propylene diene terpolymer) rubber is used in the present invention as a binder in binding all the solid fillers. EPDM has the advantage of low specific gravity, good aging resistance and a lower glass transistion temperature than other rubbers such as nitrile-butadiene rubber or chloroprene rubber. Additionally, liquid EPDM is added to adjust elasticity of the uncured insulator sheet to enhance its practical application process capability.

In the insulator of the present invention, EPDM rubber act as a binding agent in that sulfur is used as curing agent. The formulated insulator is capable to be cured under a temperature lower than 150° C. that is the lowest depletion temperature for a peroxide type curing agent. Sulfur is added in a range from 0.5 phr to 5 phr of the EPDM rubber, and preferably from 1 phr to 3 phr. N-tert-butyl-2-benzothiazole sulfenamide is used as a curing accelerator in a range from 0.3 phr to 2 phr of the EPDM rubber, and preferably from 0.5 phr to 1.5 phr. 4,4'-dithio dimorpholine is also used as a curing accelerator in a range from 0.3 phr to 2 phr of the EPDM rubber, and preferably from 0.5 phr to 1.5 phr.

Preferably, polyaramid fiber use din the present invention is in pulp form that has a length to diameter ratio preferably in a range about 500. The specification of the polyaramid fiber are listed in Table 1.

TABLE 1

| Properties of Polyaramid Fiber | |
|---|---|
| Tensile Strength ($kg/cm^2 \times 10^3$) | 300~40 |
| Tensile Modulus ($kg/cm^2 \times 10^6$) | 7.6~10 |
| Elongation at Break (%) Elongation at Break (%) | 3~5 |
| Specific Gravity ($gm/cm^3$) | 1.4~1.5 |
| Fiber Diameter ($\mu m$) | 10~14 |
| Decomposition Temperature (° C.) | 400~600 |
| Thermal Expansion Coefficient ($10^{-6}/°$ C.) | –2 |

The fiber of polyaramid pulp used in this invention is 0.5~4 mm long, more preferably 1~3 mm long, and is added in the insulator formulation in a range from 5 phr to 50 phr of the EPDM rubber, and more preferably from 10 phr to 30 phr.

Liquid EPDM rubber is another organic material that is suitably employed in the elastomer materials of this invention. A typical level is between about 5 phr to 50 phr, and preferably from 20 phr to 45 phr. Liquid EPDM can increase ablation resistance of the cured insulator as well as acting as a plasticizer that reduces stiffness of the uncured EPDM insulator of this invention. Liquid EPDM also acts as an adhesion binder to combine solid fillers, polyaramid fiber and solid EPDM rubber in the insulator recipe of this invention. Basically, liquid EPDM rubber has the same chemical structure as the solid EPDM rubber and is completely compatible therewith. These two kinds of rubbers differ in molecular weight only. They co-cure simultaneously, if the same diene monomer is used, when the insulator is heated to cure. In this way, liquid EPDM plasticizer in the uncured insulator will not migrate to the surface of the insulator after the insulator is cured. The net effect is to insure storage security of the rocket during its service period. Liquid EPDM rubber in the insulator of this invention also exhibits a tacky effect that promotes adhesion between layers of the insulator sheets. This effect can even be further improved by using a tackifier in the compounding recipe. The tackifier used in the present invention is synthetic polyterpene resin that is added in a range from 1 phr to 10 phr of EPDM rubber, and more preferably from 4 phr to 8 phr.

In order to improve the ablation resistance of the insulator, aluminum hydroxide ($Al(OH)_3$), magnesium hydroxide ($Mg(OH)_2$), silicon dioxide ($SiO_2$), chlorinated flame retardant and zinc hydroxystannate ($ZnSn(OH)_6$) are used in the present invention as ablation resistant fillers. When individually used, $Al(OH)_3$, $Mg(OH)_2$ and $ZnSn(OH)_6$ decompose and give off $H_2O$ molecules under high temperature to effectively cool the carbonized char surface of the insulator. The insulator is therefore restrained from high temperature for a longer time in the drastic environment of motor case compare to those no metal hydroxide is provided. Use of zinc hydroxystannate in the insulator of this invention gives a synergistic effect when it combines with aluminum hydroxide, magnesium hydroxide and chlorinated flame retardant. The net effect is a significant reduction in the ablation rate if compared with that of when these fillers are used individually. Zinc hydroxystannate used in the present invention is in a range from 1 phr to 20 phr of EPDM rubber and more preferably from 3 phr to 10 phr.

Compared to antimony oxide ($Sb_2O_3$) used in the traditional insulator, zinc hydroxystannate of the present invention produces much less gas toxicity and lower smoke density after the insulator is burnt and decomposed. Zinc hydroxystannate may also effectively reduce net weight of the insulator in the rocket motor due to the lower specific gravity thereof, i.e., the specific gravity of zinc hydroxystannate is 3.3 $gr/cm^3$ whereas that of antimony oxide is 5.6 $gr/cm^3$. Compared to antimony oxide, a smaller quantity of zinc hydroxystannate is used in the insulator formulation recipe to achieve the same ablation resistance for these two insulators thus formed. A insulator composed of zinc hydroxystannate may therefore enhances firing range of the rocket. Other properties of zinc hydroxystannate are listed in Table 2.

TABLE 2

Properties of Zinc Hydroxystannate

| Chemical Structure | $ZnSn(OH)_6$ |
|---|---|
| Physical Form | White Powder |
| Analysis Value | ~41% Sn; ~23% Zn |
| Specific Gravity | 3.3 gr/cm$^3$ |
| Decomposition Temperature | ~200° C. |
| Oral Toxicity ($LD_{50}$, rats) | >5 gr/kg |

According to the present invention, the insulator possesses properties of low specific gravity (1.140~1.210 gr/cm$^3$ tested according to G-GTS 1763 method), suitable hardness (Shore A 85±7), low thermal conductivity ($\leq 0.245$ Kcal/m.h.° C. tested according to ASTM D 581), excellent ablation resistance ($\leq 0.095$ mm/sec tested according to ASTM E 285), good aging resistance, high elasticity at low temperature, low smoke density and low smoke toxicity. The insulator of this invention is not hazardous to the environment, and matches well the insulator requirements of advanced rocket motors.

In the composition of the insulator of the present invention, the solid EPDM rubber (EPDM rubber) is usually in a range from 50 phr to 95 phr, and preferably from 55 phr; the liquid EPDM rubber is usually in a range from 5 phr to 50 phr, and preferably from 20 phr to 45 phr; the polyaramid fiber is usually in a range from 5 phr to 50 phr, and preferably from 10 phr to 30 phr; the zinc hydroxystannate is usually in a range from about 1 phr to 20 phr, and preferably from 3 phr to 10 phr; the chlorinated flame retardant can be 1,2,3,4,7,8,9,10,13,13,14,14-dodecachloro-1,4,4a,5,6,6a,7,10,10a,11,12,12a dodecahydro-1,4,7,10-dimethanodibenzo(a.e)cyclo octene, or a mixture thereof, and preferably Dechlorane Plus® 25, which is usually added in a range from 10 phr to 50 phr, and preferably from 20 phr to 40 phr.

In addition, inorganic fillers included in the composition of the insulator are usually in a range from 20 phr to 120 phr, which can be silicon dioxide, aluminum hydroxide or magnesium hydroxide or a mixture thereof.

EXAMPLE 1

EPDM rubber (322.6 grain, 60 phr) is masticated in a 1-liter Banbury mixer for 20 seconds. Liquid EPDM rubber (215.1 grain, 40 phr) and polyaramid fiber (107.5 grain, 20 phr) are then incorporated and mastication proceeds for another 40 seconds. In this way, polyaramid fiber surface will be throughly coated with liquid EPDM and then is well dispersed in solid EPDM rubber. Next, stearic acid (5.4 grain, 1 phr) is added for blending of 20 seconds, and then silicon dioxide (107.5 grain, 20 phr) and aluminum hydroxide (107.5 grain, 20 phr) are added for blending for 30 seconds. Zinc hydroxystannate (26.9 grain, 5 phr) and 1,2,3,4,7,8,9,10,13,13,14,14-dodecachloro-1,4,4a,5,6,6a,7,10,10a,11,12,12a-dedecahydro-1,4,4a,7,10-dinethanodibenzo(a.e)cyclooctene (Dechlorane Plus® 25) (188 grain, 35 phr) are added for blending for 30 seconds. Substituted diphenylamine (5.4 grain, 1 phr), synthetic polyterpene resin (32.3 grain, 6 phr) and chlorinated wax (53.8 grain, 10 phr) are added for blending for 30 seconds. Zinc oxide (26.9 grain, 5 phr) is then added for blending for 20 seconds. The blended rubber stock is then brought to a two-roll mixer to add sulfur (10.7 grain, 2 phr) and 4,4'-dithio dimorpholine (5.38 grain, 1 phr) for mixing for 2 minutes. Accordingly, the insulator of the present invention can be obtained.

EXAMPLES 2–5

The operation procedure of Example 1 is listed in Table 3. Formulation ingredients are changed according to Examples 2,3,4 and 5 in Table 4.

TABLE 3

Insulator Preparation Procedure

| Procedure | Machine Used | Mixing Time (sec) |
|---|---|---|
| Mastication | Banbury Mixer | 20 |
| Polyaramid Fiber Addition | Banbury Mixer | 40 |
| Stearic Acid Addition | Banbury Mixer | 20 |
| Inorganic Filler Addition | Banbury Mixer | 30 |
| Organic Filler Addition | Banbury Mixer | 30 |
| Tackifier/Antioxidant Addition | Banbury Mixer | 30 |
| Sulfur and Accelerator Addition | Two-roll Mixer | 120 |

TABLE 4

Test Samples Formulation Comparison

| Rubber Ingredient (Phr) | Example 2 | Example 3 | Example 4 | Example 5 |
|---|---|---|---|---|
| EPDM Rubber[a] | 60 | 60 | 60 | 60 |
| liquid EPDM Rubber[b] | 40 | 40 | 40 | 40 |
| Zinc Oxide | 5 | 5 | 5 | 5 |
| Stearic Acid | 1 | 1 | 1 | 1 |
| Antioxidant[c] | 1 | 1 | 1 | 1 |
| Polyaramid Fiber[d] | 30 | 30 | 30 | 30 |
| Aluminum Hydroxide | 20 | 20 | 20 | — |
| Magnesium Hydroxide | — | — | — | 20 |
| Silicon Dioxide[e] | 20 | 20 | 20 | 20 |
| Chlorinated Flame Retardant[f] | 35 | 35 | 35 | 35 |
| Zinc Hydroxystannate | — | — | 5 | 5 |
| Tackifier[g] | 6 | 6 | 6 | 6 |
| Antimony Oxide | — | 10 | 10 | — |
| Chlorinated Wax | 10 | 10 | 10 | 10 |

[a]Sumitomo 505A
[b]Trilene 67
[c]Naugard 445
[d]Kevlar pulp
[e]Hi-Sil 233T
[f]Dechloran Plus 25
[g]Wingtack 95

The products obtained from Examples 1–5 were calendered into thin sheet through a calender machine and collected into rolls. Polyethylene film was used as backing separator between each layer of insulator sheet. The uncured insulator rubber sheet is then cut and processed through a suitable method, such as the inflatable mandrel technique, to prepare an insulator of a rocket motor.

Test Examples 1–5

Properties of the insulators obtained from Examples 1–5 are listed din Table 5. The biaxial nature of the insulator sheet is formed due to the alignment of the polyaramid fibers along the direction of the roller movement during calendering. Therefore, physical properties of the insulator sheet are totally different depending on whether the polyaramid fiber is parallelly or perpendicularly distributed. The test results are also listed in Table 5.

TABLE 5

Comparison of Example 1 through Example 5

| Characteristics | Example 1 | Example 2 | Example 3 | Example 4 | Example 5 |
|---|---|---|---|---|---|
| Uncured Insulator Tensile Strength (kg/cm$^2$) | | | | | |
| Parallel | 9.92 | 11.59 | 13.28 | 16.13 | 16.37 |
| Perpendicular | 4.29 | 6.02 | 2.38 | 5.76 | 13.72 |
| Elongation at Break (%) | | | | | |
| Parallel | 23.1 | 49.70 | 8.75 | 17.48 | 9.22 |
| Perpendicular | 21.89 | 24.23 | 31.41 | 26.83 | 16.58 |
| Cured Insulator Tensile Strength (kg/cm$^2$) | Curing condition: 150° C., 30 kg/cm$^2$, 2 hr. | | | | |
| Parallel | 143.99 | 124.14 | 137.09 | 106.68 | 85.29 |
| Perpendicular | 125.55 | 108.16 | 68.95 | 112.21 | 50.99 |
| Elongation at Break (%) | | | | | |
| Parallel | 20.98 | 21.77 | 20.11 | 24.51 | 24.86 |
| Perpendicular | 20.40 | 22.72 | 51.06 | 25.13 | 45.74 |
| Hardness (Shore A) | 86 | 87 | 88 | 88 | 84 |
| Specific Gravity (gr/cm$^3$) | 1.18 | 1.18 | 1.19 | 1.23 | 1.18 |
| Thermal conductivity (Kcal/mh° C.) | 0.227 | 0.231 | 0.237 | 0.243 | 0.238 |

As shown in Table 5, the uncured insulator of the present invention is pliable to be practically applied through the inflatable mandrel technique. In this method, the insulator is overlapped on a rubber air bag. The bag is then inflated in the rocket motor case and the insulator is therefore tightly adhered on it. After the bag is vented and moved out, the insulator is heated to cure. Furthermore, the uncured insulator is soft but tough enough that it is suitable for various processing methods, such as the hand lay up process, the inflatable mandrel technique, the strip-winding method and the wrapping on propellant grain method, for practical application.

TEST EXAMPLES 6–10

The uncured insulators obtained from Examples 1–5 of this invention are cured in a mold under 120° C., 5 kg/cm$^2$ for 2 hours into 6 mm insulator plates. The ablation rates of these insulator samples were characterized according to ASTM E 285. In this method, flame formed by a mixture of oxygen (2.4 ft$^3$/min) and acetylene (1.7 ft$^3$/min) was used as the heat source for the touch blaze that vertically belches the sample. Time to burn through the samples was recorded to measure the ablation rate thereof as listed in Table 6.

TABLE 6

Ablation Rate Characterization of Insulator Specimens

| Test Samples | Erosion Rate (mm/sec) | Decomposition Rate (sec/mm) |
|---|---|---|
| Example 1 | 0.079 | 12.62 |
| Example 2 | 0.092 | 10.87 |
| Example 3 | 0.081 | 12.38 |
| Example 4 | 0.087 | 11.56 |
| Example 5 | 0.080 | 12.57 |

As shown in Table 6, the insulator of the present invention exhibits superior ablation resistance. Insulator carbonizesto form hard char and therefore has a high insulation character. The insulator of present invention is well suitable to be used in rocket motor cases of tactical missiles.

TEST EXAMPLES 11–13

The insulators of Examples 1–3 were brought to smoke density test in accordance with ASTM E 662 in which an NBS Smoke Box is applied. Test sample specimens were prepared from Examples 1, 2 and 3. All the formulation ingredients in these examples were kept the same except the amount of zinc hydroxystannate and antimony oxide. The test results are listed in Table 7.

TABLE 7

Smoke Density Test of Insulator

| Ingredients | Example 1 | Example 2 | Example 3 |
|---|---|---|---|
| ZHS(phr) | 5 | — | — |
| Sb$_2$O$_3$(phr) | — | — | 10 |
| Al(OH)$_3$(phr) | 20 | 20 | 20 |
| Smoke (Dm)* | 167 | 199 | 219 |

*flame burning, no unit

The test results indicating that the reduction in smoke density of the insulator with zinc hydroxystannate and Al(OH)$_3$ added is superior to those containing Sb$_2$O$_3$ and Al(OH)$_3$ or only Al(OH)$_3$ are provided.

TEST EXAMPLES 14–16

The insulators of Examples 1–3 were brought to smoke toxicity test in accordance with ASTM E 1687 in which an NIBS Combustion Toxicity Apparatus is applied. Test sample specimens were prepared from Examples 1, 2 and 3. All the formulation ingredients in these examples were kept the same except the amounts of zinc hydroxystannate and antimony oxide.

The test results are listed in Table 8.

TABLE 8

Smoke Toxicity Test of Insulators

| Ingredient | Example 1 | Example 2 | Example 3 |
|---|---|---|---|
| ZHS(phr) | 5 | — | — |
| $Sb_2O_3$(phr) | — | — | 10 |
| $Al(OH)_3$(phr) | 20 | 20 | 20 |
| Smoke Toxicity, $LD_{50}(g/m^3)$ | 41.25 | 30.30 | 26.92 |

The test results indicating that reduction in smoke toxicity of insulator with zinc hydroxystannate and $Al(OH)_3$ added is superior to those containing $Sb_2O_3$ and $Al(OH)_3$ or only $Al(OH)_3$ are provided.

Although the present invention has been explained in relation to its preferred embodiment, it is to be understood that many other possible modifications and variations can be made without departing from the and scope of the invention as hereinafter claimed.

What is claimed is:

1. An elastomeric insulating composition for a solid propellant rocket motor which comprises:
    (a) 50 phr to 95 phr of a solid ethylene-propylene diene terpolymer rubber;
    (b) 5 phr to 50 phr of a liquid ethylene-propylene diene terpolymer rubber;
    (c) 5 phr to 50 phr of a polyaramid fiber;
    (d) 1 phr to 3 phr of a sulfur;
    (e) 1 phr to 3 phr of a curing accelerator, said curing accelerator is selected from the group consisting of 4,4'-dithio dimorpholine and N-tert-butyl-2-benzo thiazole sulfenamide and a mixture thereof; and
    (f) 1 phr to 20 phr of a zinc hydroxystannate;
    (g) 10 phr to 50 phr of a chlorinated flame retardant which is 1,2,3,4,7,8,9,10,13,13,14,14-dodecachloro-1,4,4a,5,6,6a,7,10,10a,-11,12,12a-dodecahydro-1,4,7,10-dimethanodibenzo(a.e)cyclooctene;
    (h) 20 phr to 120 phr of an inorganic filler, said inorgenic filler is selected from the group consisting of silicon dioxide, aluminum hydroxide and magnesium hydroxide and a mixture thereof;
    (i) 4 phr to 8 phr of a tackifier of synthetic polyterpene resin.

2. The composition as claimed in claim 1, wherein said chlorinated flame retardant content ranges from 20 phr to 40 phr.

3. The composition as claimed in claim 1, wherein said solid ethylene-propylene diene terpolymer rubber content ranges from 55 phr to 80 phr.

4. The composition as claimed in claim 1, wherein said liquid ethylene-propylene diene terpolymer rubber content ranges from 20 phr to 45 phr.

5. The composition as claimed in claim 4, wherein said polyaramid fiber content ranges from 10 phr to 30 phr.

6. The composition as claimed in claim 5, wherein said zinc hydroxystannate content ranges from 3 phr to 10 phr.

* * * * *